United States Patent Office 3,470,232
Patented Sept. 30, 1969

3,470,232
DIURETHANE COMPOUNDS
Max Duennenberger, Frenkendorf, and Max Schellenbaum, Riehen, Switzerland, assignors to Ciba Limited, Basel, Switzerland, a company of Switzerland
No Drawing. Filed Feb. 15, 1966, Ser. No. 527,496
Claims priority, application Switzerland, Mar. 2, 1965, 2,878/65
Int. Cl. C07c 125/04, 147/12
U.S. Cl. 260—471     1 Claim

ABSTRACT OF THE DISCLOSURE

New di-urethanes are provided which are represented by the formula

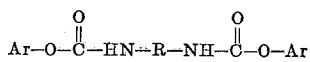

where R is an alkylene radical containing 2 to 18 carbon atoms which may be interrupted by oxygen, sulphur, SO, $SO_2$ or by an N-alkyl group containing up to 8 carbon atoms, or a divalent aromatic or araliphatic radical, and Ar represents a tri- or tetrahalogenophenyl.

The compounds of this invention are especially useful as biocides for combating pests such as bacteria, fungi, fungus spores, worms, insects, snails and the like.

---

The present invention provides preparations for combating harmful micro-organisms that contain as active ingredient at least one di-urethane of the general formula (I)

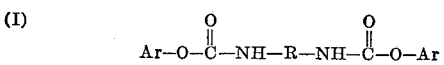

where R represents an alkylene radical containing 2 to 18 carbon atoms which may be interrupted by oxygen, sulphur, SO, $SO_2$ or an N-alkyl group containing up to 8 carbon atoms, or a divalent aromatic or araliphatic radical, and Ar represents a tri- or tetrahalogenophenyl radical, and may further contain one or several solvents, solid, liquid or gaseous diluents, adhesives, emulsifiers, dispersants, wetting agents and further pesticides.

The present invention provides especially preparations that contain as active ingredients at least one di-urethane of the general Formula I, where Ar represents a 2,4,5-trihalogenophenyl or 2,3,4,6-tetrahalogenophenyl residue, and R represents an alkylene radical containing 2 to 12 carbon atoms or a divalent aromatic or araliphatic radical containing 6 to 14 carbon atoms.

As mentioned above, the divalent radical R may represent a radical of aliphatic, aromatic or araliphatic nature.

It may be, for example, a purely aliphatic radical such as ethylene, propylene, tetra-, penta-, hexa-, dodeca- or terdecamethylene, or it may be a purely aromatic radical, for example a 1,4-phenylene, 1,3-phenylene, 4-methyl-1,3-phenylene, 3,3'-dimethyl-4,4'-diphenylene or 1,5-naphthylene radical. Such an aromatic divalent radical may further contain halogen atoms, for example chlorine or bromine atoms.

Furthermore, R may be an araliphatic radical, for example a 4,4'-diphenylenemethane, a halogenated 4,4'-diphenylenemethane or a 1,4-ditoluylene radical.

As mentioned above, the aryl radical Ar consists preferably of a 2,4,5-trihalogenophenyl or 2,3,4,6-tetrahalogenophenyl radical.

Preferred use is made of chloro compounds, though bromo or iodo compounds may likewise be used, or mixed halogenated compounds such as are readily accessible, for example by after-halogenating dichloro or trichloro compounds.

Thus, for example, when 2,5-dichlorophenol is iodinated with iodine chloride it gives rise to 2,5-dichloro-4-iodophenol, and when 3-bromophenol is chlorinated it furnishes 2,4-dichloro-5-bromophenol.

As mentioned above the di-urethanes of the Formula I display a pronounced activity against harmful organisms of the vegetable and animal kingdoms.

The di-urethanes of the Formula I are especially active against bacteria, fungi, fungus spores, worms, insects, snails and the like. Thus, the di-urethanes of the Formula I have a broad activity spectrum as pesticides.

In this connection it is particularly advantageous that the di-urethanes of the Formula I produce no toxic side-effects on culture plants and warm-blooded animals when used in the concentration required in antiparasitary applications. This enables the di-urethanes of the Formula I to be used for combating harmful organisms on a board basis, for example in plant protection, timber protection, for preserving a wide variety of technical products, for protecting fibrous materials from harmful micro-oganisms, for preserving agricultural produce, as disinfectants in veterinary medicine, in general hygiene and in body care.

In this connection it is of special significance that the di-urethanes of the Formula I, do not lose their bactericidal and fungicidal activity even in the presence of protein substances and soaps. The di-urethanes of the Formula I have no objectionable odour of their own and are readily tolerated by the skin, at least by healthy skin.

As examples of uses of the di-urethanes in plant protection there may be mentioned the treatment of plant seeds, of wholly or only partially developed plants and of the soil in which the plants grow to protect them against harmful organisms, especially harmful fungi, fungus spores, bacteria, nematodes and insects, in which applications the absence of phytotoxic side-effects of the active concentrations of the di-urethanes is likewise of special importance.

As examples of technical products that can be preserved or disinfected with the di-urethanes I there may be mentioned: Textile auxiliaries and adjuvants, glues, binding agents, paints, thickeners, colour and printing pastes and similar preparations based on organic or inorganic dye-stuffs or pigments, including those which incorporate casein or other organic compounds. Furthermore, wall and ceiling paints, for example such as contain a proteinic paint binding agent, are protected from pest attacks by an addition of the di-urethanes.

Furthermore, the di-urethanes of the Formula I may be used for protecting fibres and textile materials; in this application they display an affinity for both natural and synthetic fibres and display on them a permanent activity against harmful organisms, for example fungi, bacteria and insects. The di-urethanes may be added to the material to be protected before, together with or after a treatment of these textile materials with other substances, for example colour or prining pastes, dressings and the like.

It is a special feature of the new di-urethanes that they deposit very durably on the fibres even when no auxiliary is used. Fibres treated in this manner will withstand several washes without the activity of the impregnation suffering any impairment.

The di-urethanes of the Formula I are especially capable of protecting wool fibres against moths and other textile-eating pests. For example, when applied to the fibre from an acetonic solution or deposited on it from an aqueous bath in the presence of an emulsifier they display an outstanding action against moth larvae.

The new di-urethanes may also be used as preservatives in the cellulose and paper industries, inter alia for preventing the known slime formation in paper making machines due to micro-organisms.

Depending on the additives with which the di-urethanes are combined in the preparations of this invention there are obtained products particularly suitable for cleansing, disinfecting or body care.

Thus, for example, by combing the di-urethanes with wash-active or surface-active substances there are obtained washing and cleansing agents having an excellent antibacterial and/or antimycotic effect. The compounds of the general Formula I may be incorporated, for example, with soaps or with soap-free wash-active or surface-active substances or they may be combined with mixtures of soaps and soap-free wash-active substances.

As examples of soap-free wash-active compounds that are suitable for use in admixture with the new substances there may be mentioned alkylaryl sulphonates, tetrapropylbenzenesulphonates fatty alcohol sulphonates, condensation products of fatty acids with methyltaurine, condensation products of fatty acids with hydroxyethanesulphonates, condensation products of fatty acids with proteins, primary alkyl sulphonates, non-ionic products, for example condensation products of alkylphenols with ethylene oxides, and cationic compounds. The new di-urethanes may also be incorporated with industrial detergents, among others with a condensed phosphate, for example 20 to 50% of alkali metal tripolyphosphate, or they may be used in the presence of an organic lyophilic polymer capable of increasing the dirt-carrying capacity of the washing liquor, for example an alkali metal salt of carboxymethyl cellulose (cellulose glycollic acid).

When cleansing agents, for example anionic, cationic or non-ionic products, are combined with the di-urethanes of the Formula I the antibacterial and/or antimycotic effect of the latter is not only not impaired but, in fact, in many cases such a combination produces an unexpected synergism of the activity.

The cleansing agents obtained in this manner, which have a disinfecting action can be used, for example, in laundering. In this application it is of advantage that the new compounds, when used in a suitable concentration, deposit from the washing liquor on the fibre and impart to the latter durable antibacterial and antimycotic properties. Textile material treated in this manner is also protected from the occurrence of the perspiration odour caused by micro-organisms.

The cleansing agents of this invention containing compounds of the general Formula I may be used not only in laundering but, for example, also as industrial cleansers or as domestic cleansing agents, and also in the food industry, for example in dairies, breweries or abattoirs in agriculture and in veterinary hygiene.

The di-urethanes of the Formula I may also be used as ingredients of preparations used for cleansing and/or disinfection in hospital and in the surgery, for example for cleaning patients' garments, wards and apparatus. For these purposes the di-urethanes of the Formula I may, if necessary, be combined with other disinfectants and antiseptics, which enables the demands made on the individual cleansing or disinfectant job to be satisfied. The fact that the di-urethanes do not lose their efficacy towards micro-organisms even in the presence of blood or serum is of special importance in this connection.

Furthermore, the new di-urethanes may be incorporated with preparations used for cleaning the skin, for example the hands, so as to achieve an antibacterial and/or antimycotic effect, especially in the surgery, if required in combination with other known bactericidal or fungicidal substances, skin protectives and the like. Furthermore, they are capable of preventing the occurrence of the unpleasant body odour produced by micro-organisms. In this connection it is again of importance that the di-urethanes do not irritate the skin, at least healthy skin, and have no objectionable odour of their own, as is the case, for example, with the chlorinated phenols.

As biocidal additives which may be contained in the preparations of this invention side by side with the compounds of the general Formula I there may be mentioned, for example, 3,4-dichlorobenzyl alcohol, ammonium compounds, for example diisobutyl phenoxyethoxyethyl dimethyl benzylammonium chloride, cetyl pyridinium chloride, cetyl trimethylammonium bromide, halogenated dihydroxydiphenylmethanes, tetramethyl thiuram disulphide, 2,2-thio-bis-(4,6-dichlorophenol) and organic compounds that contain the thiotrichloromethyl group, 2-nitro-2-furfuryl iodide, salicylanilides, dichlorosalicylanilides, dibromosalicylanilides, tribromosalicylanilide, dichlorocyanuric acid, tetrachlorosalicylanilides, aliphatic thiuram sulphides and hexachlorophen (2,2'-dihydroxy-3,5,6-3',5',6'-hexachlorodiphenylmethane).

Further ingredients present in preparations of the invention having a disinfecting action may be antioxidants, light filters, optical brighteners, dehardeners, aromas and the like.

By combining the di-urethanes of the Formula I with the substances conventionally used in body hygiene there are obtained preparations that are particularly suitable for cosmetic purposes.

In view of the wide variety of their possible uses the preparations of this invention containing compounds of the general Formula I may be present in a wide variety of forms of application, for example as soaps in tablets or in semi-solid or liquid form, as pastes, powders, emulsions, suspensions, solutions in organic solvents, as sprays, granulates, tablets, pencils, in capsules from gelatin or other materials, as ointments, skin and shaving creams mouthwashes, liquid, semi-solid or solid dentifrices and other dental preparations, in hair shampoos and other preparations for the care of hair.

The activity of the di-urethanes of the Formula I towards harmful organisms of the animal and vegetable kingdoms may also be imparted to synthetics. When plasticizers are used it is advantageous to incorporate the additive with the synthetic material in the form of a solution or dispersion in the plasticizer which may be, for example, dimethyl phthalate, diethyl phthalate, dibutyl phthalate, dicyclohexyl phthalate, trihexyl phthalate, dibutyl adipate, benzylbutyl adipate, an aliphatic sulphonic acid ester or triglycol acetate. It is of advantage to ensure as uniform a distribution as possible in the synthetic material. Synthetics having sterile properties may be used for a wide variety of objects for daily use for which it is desirable to have a prophylactic activity towards a variety of pathogens, for example putrefacients or cutaneous fungi, for example in doormats, handles, fittings on doors, seats, treads in swimming baths, wall coverings, especially in hospitals and the like. Their incorporation with suitable waxes and floor polish bases furnishes products for the care of floors and furniture having disinfectant and insecticidal effects.

The new di-urethanes of the Formula I are accessible by the methods generally used for the manufacture of urethanes.

The di-urethanes of the Formula I are obtained by reacting a compound of the Formula II X—R—X with about 2 mols of a compound of the Formula III Ar—Y where X and Y represent residues capable of forming the bridge

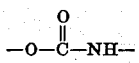

by condensation or addition. When the starting material used was a hypohalogenated compound of the formula Ar—Y, the di-urethane thus obtained is further halogenated to the desired degree.

The generally adopted procedure will consist in reacting a reactive carbonic acid derivative with a diamine of the Formula II (X=NH$_2$) and with a phenol of the Formula III (Y=OH) in either order of succession. For example, phosgene may be reacted with a diamine of the Formula II and the resulting dicarbamic acid chloride or diisocyanate may be further reacted with the appropriate number of mols of a phenol of the Formula III; or phosgene may be reacted with a phenol of the Formula III to form a chlorocarbonate which is then further reacted with an amine of the Formula II.

According to another variant for the manufacture of the desired urethane an aromatic di-N-halogencarboxylic acid amide or dicarboxylic acid azide of the Formula II (X=CONH—Hal or —CON₃) is reacted with a phenol of the Formula III.

In the method of choice the commercially readily accessible isocyanates are reacted with the corresponding phenols in which case—if the starting material used was a hypohalogenated phenol—the resulting di-urethane may be further halogenated to the desired degree.

The reaction may be carried out in a solvent, for example in benzene, toluene, dioxan or the like.

To accelerate and complete the reaction it is advantageous to perform it in the presence of a tertiary base, such as triethylamine, triethylenediamine or the like.

By the present process the following compounds, for example, may be reacted:

Ethylene diisocyanate, 1,3-propylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, undecamethylene diisocyanate, dodecamethylene diisocyanate, β,β'-diisocyanato diethyl ether, β,β'-diisocyanato diethyl sulphide, 1,3- or 1,4 - phenylene diisocyanate, tolylene-2,4 - diisocyanate, metaxylylene diisocyanate, 1,5-naphthylene diisocyanate, 4,4'-diisocyanato diphenylmethane, 4,4'-diisocyanato-3,3' - dimethyldiphenylmethane, 4,4'-diisocyanato-3,3'-dimethoxydiphenyl, 4,4'-diisocyanato-3,3'-dimethyldiphenyl and the like, with 2,4,5-trichlorophenol, 2,3,4,6-tetrachlorophenol, 2,4-dichloro-5-bromophenol, 2,5-dichloro-4-iodophenol and the like.

A possibly required after-halogenation is preferably carried out in a solvent such as glacial acetic acid, tetrachloromethane or the like.

The di-urethanes of the Formula I offer substantial and principal advantages over di-urethanes derived from pentachlorophenol. Thus, for example, di-urethanes of the Formula I, where Ar represents a 2,4,5-trihalogenophenyl radical, act efficiently against *Escherichia coli*, whereas urethanes that contain a pentachlorophenyl radical are practically inactive. Therefore, di-urethanes containing a 2,4,5-trihalogenophenyl radical, may become widely accepted in general disinfection, for example in hospitals.

Those di-urethanes of the Formula I which contain a 2,3,4,6-tetrachlorophenyl radical display a strong fungistatic effect, whereas similarly constituted derivatives of pentachlorophenol are practically little active.

The di-urethanes of the Formula I defined above are new.

Accordingly, the present invention includes also di-urethanes of the formula

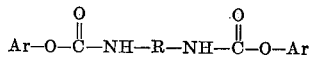

where R represents an alkylene radical containing 2 to 18 carbon atoms which may be interrupted by oxygen, sulphur, SO, SO₂ or by an N-alkyl group containing up to 8 carbon atoms, or a divalent aromatic or araliphatic radical, and Ar represents a tri- or tetra-halogenophenyl radical.

Example 1

23.2 parts of 2,3,4,6-tetrachlorophenol, 8.4 parts of hexamethylene-1,6-diisocyanate and 0.5 part of triethylamine are dissolved in 250 parts of benzene, and the reaction mixture is stirred and refluxed for 1 hour and then cooled to 10° C. The product of the formula

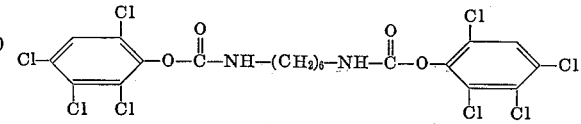

is filtered off and dried. The yield amounts to 27.8 parts. After recrystallization from chloroform+petroleum ether the purified product melts at 193 to 194° C.

Calculated for $C_{20}H_{16}O_4N_2Cl_8$: C, 38.01%; H, 2.55%; N, 4.43%. Found: C, 37.93%; H, 2.63%; N, 4.38%.

In a similar manner the compounds of the formula

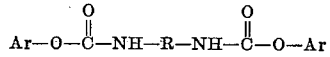

where Ar and R have the meanings listed in the following table can be manufactured:

| Compound Number | Ar= | R= | M.P., °C. | | Analysis, percent | | |
|---|---|---|---|---|---|---|---|
| | | | | | C | H | N |
| 2 | 2,4,5-trichlorophenyl | —(CH₂)₄— | 189 to 190 | Calc. | 40.41 | 2.64 | 5.24 |
| | | | | Found | 40.56 | 2.73 | 5.19 |
| | | | | | $C_{18}H_{14}O_4N_2Cl_6$ | | |
| 3 | 2,4,5-trichlorophenyl | —(CH₂)₆— | 161 to 162 | Calc. | 42.66 | 3.22 | 4.98 |
| | | | | Found | 42.94 | 3.18 | 5.03 |
| | | | | | $C_{20}H_{18}O_4N_2Cl_6$ | | |
| 4 | 2-chloro-4-iodo-5-chlorophenyl | —(CH₂)₆— | 165 to 166 | Calc. | 32.20 | 2.43 | 3.76 |
| | | | | Found | 32.29 | 2.32 | 3.68 |
| | | | | | $C_{20}H_{18}O_4N_2Cl_4I_2$ | | |
| 5 | 2,4,5-trichlorophenyl | —(CH₂)₁₂— | 145 to 146 | Calc. | 48.25 | 4.67 | 4.33 |
| | | | | Found | 48.25 | 4.62 | 4.35 |
| | | | | | $C_{26}H_{30}O_4N_2Cl_6$ | | |
| 6 | 2,3,4,6-tetrachlorophenyl | —(CH₂)₁₂— | 161 to 162 | Calc. | 43.61 | 3.94 | 3.91 |
| | | | | Found | 43.48 | 3.93 | 3.80 |
| | | | | | $C_{26}H_{28}O_4N_2Cl_8$ | | |

TABLE—Continued

| Compound Number | Ar= | R= | M.P., °C. | Analysis, percent | | |
|---|---|---|---|---|---|---|
| | | | | C | H | N |
| 7 | 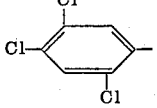 |  | 174 to 175 | Calc...... 43.28<br>Found.... 43.63<br>$C_{20}H_{10}O_4N_2Cl_6$ | 1.82<br>2.09 | 5.05<br>5.36 |
| 8 | 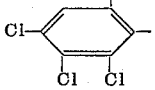 |  | 200 to 201 | Calc...... 38.50<br>Found.... 38.47<br>$C_{20}H_8O_4N_2Cl_8$ | 1.29<br>1.21 | 4.49<br>4.45 |
| 9 | 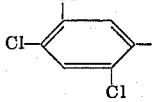 |  | 169 to 171 | Calc...... 44.32<br>Found.... 44.08<br>$C_{21}H_{12}O_4N_2Cl_6$ | 2.13<br>2.18 | 4.92<br>5.03 |
| 10 | 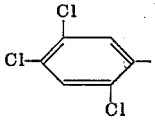 | 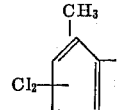 | 167 to 169 | Calc...... 39.54<br>Found.... 39.02<br>$C_{21}H_{10}O_4N_2Cl_8$ | 1.58<br>1.42 | 4.39<br>4.61 |
| 11 | 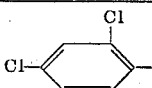 |  | 171 to 172 | Calc...... 39.54<br>Found.... 39.71<br>$C_{21}H_{10}O_4N_2Cl_8$ | 1.58<br>1.52 | 4.39<br>4.50 |
| 12 | 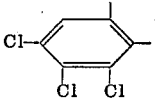 | 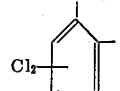 | 167 to 169 | Calc...... 35.68<br>Found.... 35.24<br>$C_{21}H_8O_4N_2Cl_{10}$ | 1.14<br>1.09 | 3.96<br>4.08 |
| 13 | 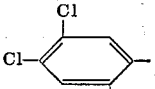 | 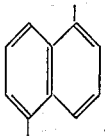 | 219 to 220 | Calc...... 47.64<br>Found.... 47.97<br>$C_{24}H_{12}O_4N_2Cl_6$ | 2.00<br>2.21 | 4.63<br>4.73 |
| 14 | 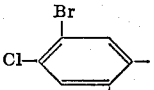 | 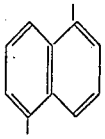 | 217 to 219 | Calc...... 41.54<br>Found.... 41.57<br>$C_{24}H_{12}O_4N_2Cl_4Br_2$ | 1.74<br>1.72 | 4.04<br>4.04 |
| 15 | 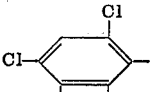 | 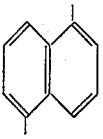 | 219 to 220 | Calc...... 42.77<br>Found.... 42.58<br>$C_{24}H_{10}O_4N_2Cl_8$ | 1.50<br>1.46 | 4.16<br>4.02 |
| 16 | 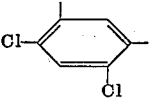 | 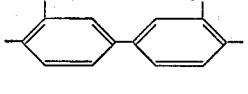 | 207 to 208 | Calc...... 51.02<br>Found.... 51.55<br>$C_{28}H_{18}O_4N_2Cl_4$ | 2.75<br>3.02 | 4.25<br>4.30 |
| 17 | 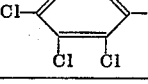 | 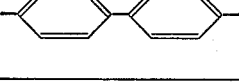 | 207 to 209 | Calc...... 46.19<br>Found.... 45.95<br>$C_{28}H_{16}O_4N_2Cl_6$ | 2.22<br>2.06 | 3.85<br>3.84 |
| 18 | 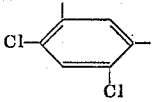 | 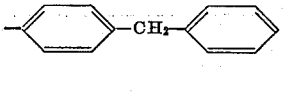 | 175 to 176 | Calc...... 50.26<br>Found.... 50.84<br>$C_{27}H_{16}O_4N_2Cl_6$ | 2.50<br>2.53 | 4.34<br>4.46 |

TABLE—Continued

| Compound Number | Ar= | R= | M.P., °C. | | Analysis, percent | | |
|---|---|---|---|---|---|---|---|
| | | | | | C | H | N |
| 19 | 2,4-dichloro-5-iodophenyl | -C6H4-CH2-C6H4- | 175 to 177 | Calc. | 39.16 | 1.95 | 3.38 |
| | | | | Found | 39.15 | 1.92 | 3.31 |
| | | | | $C_{27}H_{16}O_4N_2Cl_4I_2$ | | | |
| 20 | 2,3,4,6-tetrachlorophenyl | -C6H4-CH2-C6H4- | 203 to 204 | Calc. | 45.41 | 1.98 | 3.92 |
| | | | | Found | 45.32 | 1.79 | 4.02 |
| | | | | $C_{27}H_{14}O_4N_2Cl_8$ | | | |

Example 2.—Measuring the minimal inhibitory concentration towards bacteria and fungi in the dilution test The determination of the minimal inhibitory concentration is carried out by a test adapted from the standard specifications which makes it possible to arrive at an approximation to absolute minimal inhibitory concentrations of an active substance.

A 1% solution and a 0.3% solution of the active substances in dimethyl sulphoxide are introduced into small tubes containing sterile glucose broth (for the bactericidal test) and, beer wort solution (for the fungistatic test) respectively, and made up with the solutions to dilution series by tens. By combining the two series the following continuous dilution series is obtained:

1000, 300, 100, 30, 10, 3 parts per million and so forth.

The solutions are inoculated with the bacteria *Staphylococcus aureus* and *Escherichia coli* and with the fungi *Aspergillus niger* and *Rhizopus nigricans*. The bacterial preparations are then incubated for 48 hours at 37° C. (bacteriostatic test) and the fungus preparations for 72 hours at 25° C. (fungistatic test).

After the indicated times the minimal inhibitory concentrations in parts per million shown in the following table are recorded:

| Compound Number | Minimal inhibitory concentration in parts per million | | | |
|---|---|---|---|---|
| | Staphylococcus aureus | Escherichia coli | Aspergillus niger | Rhizopus nigricans |
| 5 | 100 | 100 | 10 | 10 |
| 7 | 30 | 30 | 10 | 10 |
| 9 | 100 | 100 | 10 | 10 |
| 10 | 30 | 30 | 10 | 10 |
| 13 | 30 | 30 | 10 | 10 |
| 14 | 10 | 100 | 10 | 10 |
| 16 | 30 | 30 | 10 | 10 |
| 18 | 30 | 30 | 10 | 10 |
| 19 | 10 | 100 | 3 | 3 |
| 1 | 100 | | 3 | 3 |
| 8 | 100 | | 10 | 3 |
| 11 | 100 | | 10 | 3 |
| 12 | 10 | | | |
| 15 | 100 | | 10 | 10 |
| 17 | 100 | | 3 | 3 |
| 20 | 100 | | 3 | 3 |

Example 3

A paste made from 100 parts of polyvinylchloride, 59 parts by volume of dioctyl phthalate and 2 parts of the active substance is rolled on a calender heated at 150° C. to form a foil 1 mm. thick. Roundels of 10 mm. blanked out of this foil are placed on glucose agar plates previously inoculated with *Staphylococcus aureus*. After 24 hours' incubation at 37° C. the inhibitory zone around the roundels, measured in mm., and the growth (G in percent) discernible underneath it under a microscope are assessed.

The table lists the results without stability test (t.q.) and after EMPA-watering (24 hours at 29° C.).

| Compound Number | t.q. | | watered | |
|---|---|---|---|---|
| | Inhibitory zone, mm. | G, Percent | Inhibitory zone, mm. | G, Percent |
| 11 | 4.5 | 0 | 2 | 0 |
| 15 | 4.5 | 0 | 2.5 | 0 |
| 17 | 3.5 | 0 | 2 | 0 |

Example 4

50 grams of active substance are intimately mixed with 40 g. of kaolin, 5% SiO₂, 3.5 g. of a condensation product of octylphenol with 6 to 8 mols of ethylene oxide and 1.5 g. of a wetting agent and then ground.

To test the effect against phytopathogenic fungi an aqueous suspension of 0.4% is used, which corresponds to a concentration of 0.2% of active substance.

Example 5

Celery plants with 5 leaves are treated with a spray broth containing 0.2% of the active substances Nos. 1, 9, 16, 17 and 20. 2 days after the treatment the plants are inoculated with spores of *Seporia apii*.

Evaluation of the results reveals that the aforementioned active substances provide a 90% to 100% protection against attacks by *Septoria apii* to the celery plants compared with the untreated control plants. No phytotoxic effects were observed.

What is claimed is:
1. The di-urethane compound of the formula

$$\text{Ar}-\text{O}-\overset{\text{O}}{\underset{\|}{\text{C}}}-\overset{\text{H}}{\underset{|}{\text{N}}}-\text{R}-\overset{\text{H}}{\underset{|}{\text{N}}}-\overset{\text{O}}{\underset{\|}{\text{C}}}-\text{O}-\text{Ar}$$

wherein Ar represents a member selected from the group consisting of 2,4,5-trihalogenophenyl and 2,3,4,6-tetrahalogenophenyl, and R represents a member selected from the group consisting of a —(CH₂)ₙ group, wherein $n$ is a whole number from 2 to 12, a benzene, a naphthalene, a diphenyl, a diphenylmethane, a toluene, a ditoluene and a dichlorotoluene radical.

References Cited

UNITED STATES PATENTS 2,933,383  4/1960  Lambrech _____ 260—479

LORRAINE A. WEINBERGER, Primary Examiner

L. ARNOLD THAXTON, Assistant Examiner

U.S. Cl. X.R.

260—479, 481, 999